Figure 1:
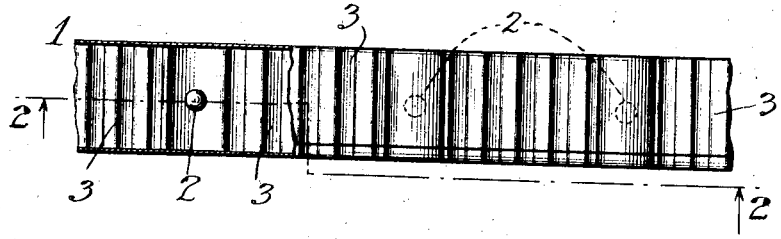

E. E. GRAY.
PACKAGE.
APPLICATION FILED JUNE 10, 1916.

1,333,411.

Patented Mar. 9, 1920.

Witnesses
Marlin H. Olsen,
Edna A. Olason.

Inventor
Edward E. Gray
By Jno. E. Waldo
Atty.

UNITED STATES PATENT OFFICE.

EDWARD E. GRAY, OF PLANO, ILLINOIS, ASSIGNOR, BY MESNE ASSIGNMENTS, TO IVERS-LEE COMPANY, OF NEWARK, NEW JERSEY, A CORPORATION OF DELAWARE.

PACKAGE.

1,333,411.   Specification of Letters Patent.   Patented Mar. 9, 1920.

Application filed June 10, 1916. Serial No. 102,968.

*To all whom it may concern:*

Be it known that I, EDWARD E. GRAY, a citizen of the United States, and resident of Plano, in the county of Kendall and State of Illinois, have invented certain new and useful Improvements in Packages, of which the following is a specification.

This invention relates to packages of a general type consisting of a strip of suitable packaging or fibrous material, as paper, in which the seeds or other articles to be packaged are inclosed. In the case of seed tape one object is to facilitate planting of the seeds, said inclosing medium being preferably of such texture that it will disintegrate readily when subjected to moisture, as the moisture of the soil in which the seeds are planted, thus permitting the seeds to germinate and grow in the usual way. A material of different texture or character may however be utilized in packaging articles other than seeds.

The seed tape package, which is the type illustrated in the drawings forming a part of the present specification, is adapted to be planted by making a continuous furrow of proper depth in the ground and laying the seed tape therein, the spacing of the seeds in the forming of the seed tape serving to properly distribute the seeds in the ground.

In accordance with the present invention, the strip of fibrous or packaging material, hereinafter referred to as tape material, is folded to inclose the seeds or other articles thereon, and one object of the invention is to provide means for securing said tape material in folded article protecting position and the seeds or other articles inclosed therein in desired spaced relation, without the use of adhesive.

In the accompanying drawing, in which one illustrative embodiment of my invention is shown, Figure 1 is a top plan view, partly in section, of a piece of seed tape embodying my invention.

Figure 2:
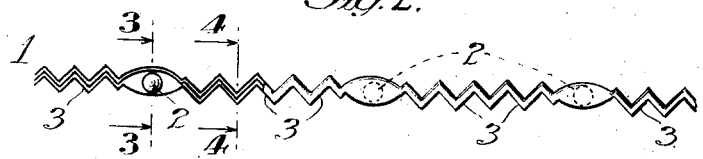
Figure 3:
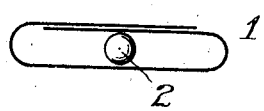
Figure 4:
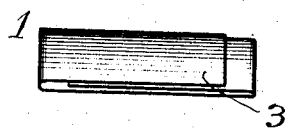

Fig. 2 is a longitudinal side view thereof, part thereof being shown in section; and Figs. 3 and 4 are transverse sectional views on the lines 3—3 and 4—4, respectively, of Fig. 1.

Referring now to the drawing, 1 designates the strip of tape or packaging material, as a whole, and 2 the seeds, the lateral edges of said tape material being folded over to inclose said seeds. In accordance with the present invention, the tape material is secured in folded position and the seeds 2 in spaced relation therein by crimping or corrugating the tape material to cause the folds thereof to adhere to each other, as shown at 3, said crimping or corrugating being effected in such manner that the seeds inclosed within said tape material will not be crushed or broken, which would, of course, render the seed tape valueless for its designed purpose. As shown, the tape material is crimped or corrugated only between the seeds contained therein, though my invention contemplates any manner of crimping or corrugating said tape material which will not crush or injure the seeds; and the word "corrugated" in the accompanying claims is used as a term generic to corrugations, crimps and the like.

With the construction shown in the drawing and heretofore described, it is obvious that the crimped or corrugated portions of the tape material will secure said tape material in folded position and will divide the same lengthwise into what may be described as separate compartments each of which may contain a seed or seeds 2, or other articles.

One form of machine adapted for the manufacture of packages of a type represented by the seed tape illustrated in the drawings of the present application is shown and described in an application for U. S. Letters Patent heretofore filed by me in the U. S. Patent Office on or about the 5th day of June, 1916, and numbered serially 101,804, to which reference is made for a full disclosure and description thereof.

My invention obviously is not restricted to the illustrated form disclosed in the drawings of the present application.

I claim:—

1. A package comprising articles and tape material surrounding said articles, the doubled thickness of said material being corrugated substantially transversely of the tape between the articles to retain said articles in proper spaced relation.

2. A package comprising articles and tape material folded over and surrounding said articles, the folded material being corrugated substantially transversely of the package between the articles to retain said articles in proper spaced relation.

3. A seed tape comprising seeds and tape material surrounding the seeds, the doubled thickness of said material being corrugated substantially transversely of the tape between the seeds to retain said seeds in proper spaced relation.

In testimony, that I claim the foregoing as my invention, I affix my signature in the presence of two subscribing witnesses this 2nd day of June, A. D. 1916.

EDWARD E. GRAY.

Witnesses:
HERSCHEL H. DEWEY,
LILA E. HARE.